May 8, 1962
J. G. HOUSE
3,032,842
METHOD OF MAKING A FUSIBLE METALLIC CORE
WITH WOVEN FIBER SLEEVE
Filed Dec. 15, 1958
2 Sheets-Sheet 1
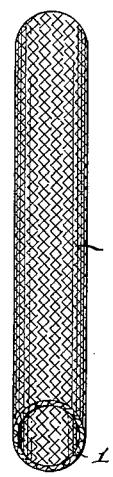
Fig.1
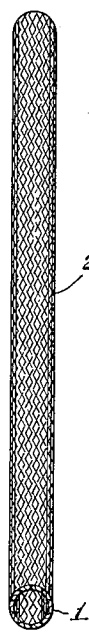
Fig.2
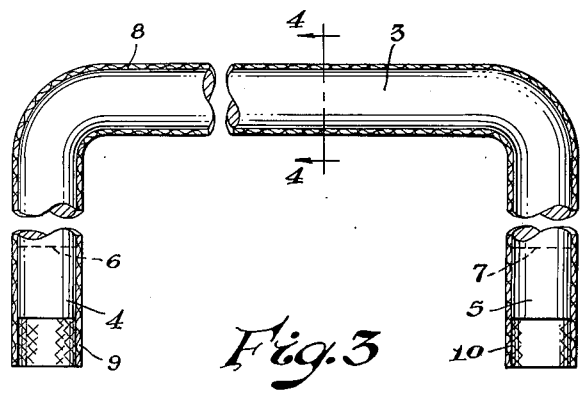
Fig.3
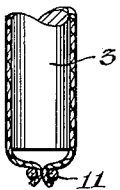
Fig.4
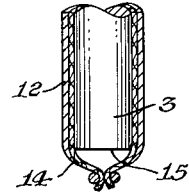
Fig.5
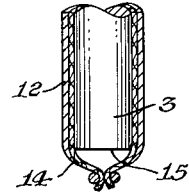
Fig.6
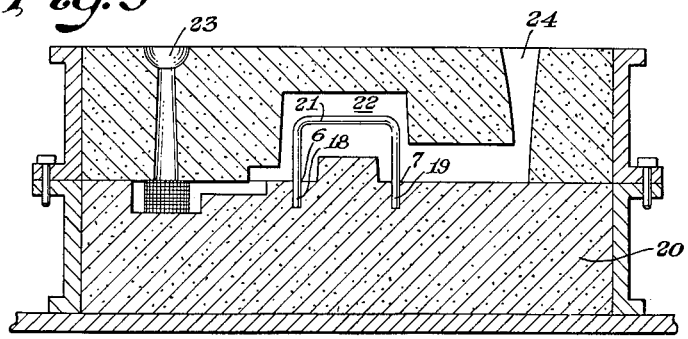
Fig.9
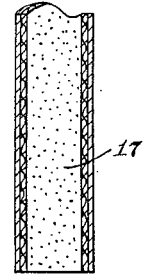
Fig.8
Fig.7
INVENTOR.
James G. House
BY
Griswold & Burdick
ATTORNEYS May 8, 1962 J. G. HOUSE 3,032,842
METHOD OF MAKING A FUSIBLE METALLIC CORE
WITH WOVEN FIBER SLEEVE
Filed Dec. 15, 1958 2 Sheets-Sheet 2
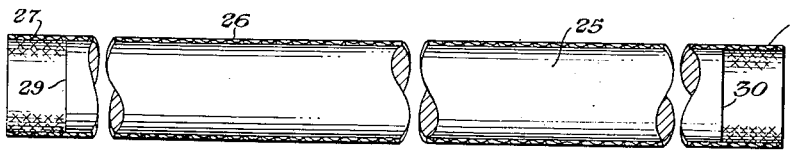
Fig. 10
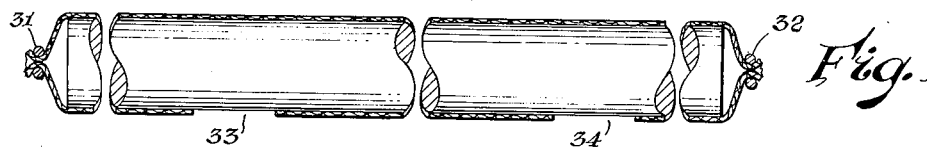
Fig. 11
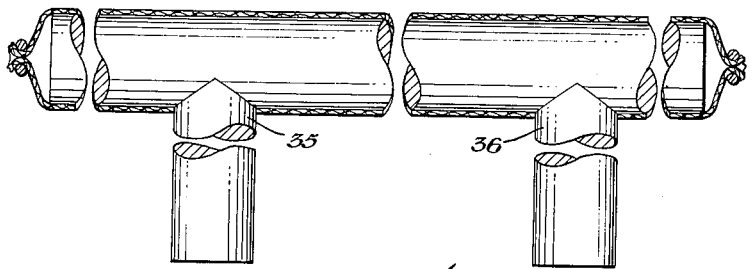
Fig. 12
Fig. 13
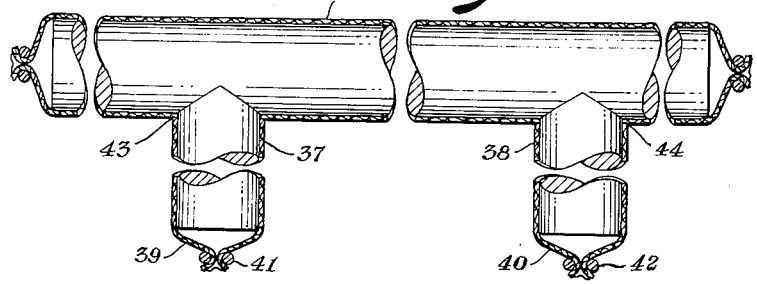
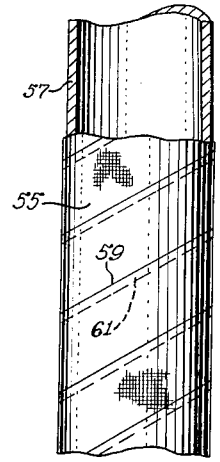
Fig. 15
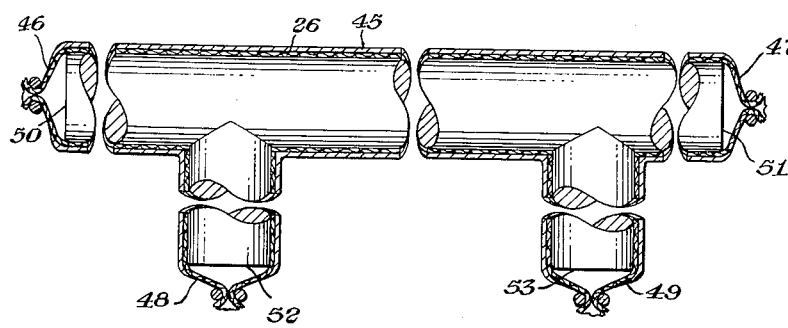
Fig. 14
INVENTOR.
James G. House
BY
Griswold & Burdick
ATTORNEYS United States Patent Office 3,032,842
Patented May 8, 1962

3,032,842
METHOD OF MAKING A FUSIBLE METALLIC CORE WITH WOVEN FIBER SLEEVE
James G. House, Bay City, Mich., assignor to The Dow Chemical Company, Midland, Mich., a corporation of Delaware
Filed Dec. 15, 1958, Ser. No. 785,103
24 Claims. (Cl. 22—194)

This application is a continuation-in-part of my copending application Serial No. 706,207, filed December 30, 1957, now abandoned, entitled, "Core for Casting Metal and Method of Making Core."

The invention relates to casting and more particularly to a method of making apparatus which is useful in casting a metal object with a passageway of generally uniform cross-section but devious course in the object.

A passageway in a casting is conventionally made by providing the casting cavity of a mold with a core or mold part, usually of baked sand composition, having the configuration of the passageway. The molten metal to be cast is poured into the mold cavity where solidification takes place about the core. Subsequently the core material is removed leaving a passageway in the casting. This method has limitations which preclude its use as in cases where the passageway is long, narrow, or devious in its course.

The principal object of the present invention is to provide a method of making a contractable core part which overcomes these limitations.

According to the invention, a method of casting a metal object in which a long narrow passageway having a devious course in a casting is produced without the limitations of the art heretofore known. The invention is predicated upon the utilization as a core of a mandrel of fusible maleable low melting point metal and a woven flexible sleeve therefor of ceramic fibers, silica fibers or metal fibers or strands, the sleeve diametrically collapsing on being stretched endwise. The sleeve so-used is slipped over the mandrel and thereby formed into the desired shape for the passageway. The sleeve is then made temporarily rigid by cementing together the fibers of which it is woven as by applying a suitable mold wash which oozes more or less into the interstices between the fibers to form a rigid core structure when the mold wash hardens as by air drying and heating. The fusible mandrel is melted out as when heating to harden the mold wash leaving a hollow rigid form. This may be further stiffened, if desired, by filling the interior with a free-flowing mass of particulate material having a coating of adhesive capable of cementing the particles together into a rigid but heat friable gas permeable mass. The rigid form so-obtained either with or without the filling is then ready for mounting as a core in the mold cavity in which the object having the desired passageway is to be cast. On casting molten metal around the so-formed core, the heat of the molten metal destroys the adhesive bonding the fibers of the sleeve and the particles of the particulate material, if any.

On allowing the casting to cool, the core is easily removed by shaking out more or less of the particulate material, if any, and by pulling the sleeve endwise. This pulling causes the sleeve to elongate and simultaneously contract in cross section, thereby disrupting the adhesive bond between the fibers and causing the sleeve to shrink away from the casting so that by continued pulling the entire sleeve is removable from the casting leaving the desired passageway.

The method is not limited in its applications to the making of passageways which though devious traverse a single continuous course. Branched passageways also can be made. For these the method is carried out in stages as regards forming the mandrel and the sleeve therefor. The preferred way of doing this is to form a mandrel having the shape of the main or largest portion of the passageway as by casting in a suitable mold or pattern. This portion of the mandrel is covered from end to end with the sleeve material. Then at each of the places along the mandrel where the passageway is to be branched a hole is cut through the sleeve and the assembly of the mandrel and sleeve is placed in another suitable mold or pattern having the desired configuration for the whole passageway including the branches. Additional mandrel metal is cast in this mold at the branches so that the added mandrel metal will form the desired branches onto the main portion of the mandrel through the holes in the sleeve. The so-added portions of mandrel are then covered with sleeves and the sleeve ends at the outer extremities of the mandrel are crimped together and tied shut so as to hold these secure on the mandrel. The whole assembly is coated with adhesive or mold wash, which is then dried and thereby more or less hardened. The tied ends of the sleeves are trimmed off and the assembly is heated to melt out the mandrel. The heating occasioned by the melting further hardens the mold wash. The resulting rigid branched mold part or core is ready for use as in the manner already described. In removing the core after the desired casting is made, the branched portions are withdrawn separately from the main portions of the sleeve by pulling on the exposed ends of the sleeves. By this method, the same mold or pattern may be used repeatedly in making mandrels for the cores and passageways having various ramifications can be made.

The invention may be further explained by reference to the accompanying drawing showing the sleeve material used and the various steps of the method employing it in forming cores or mold parts in accordance with the invention for forming a passaging in a metal casting.

In the said drawing:
FIG. 1 is an isometric view of a form of woven hollow sleeve material suitable for use in the invention.
FIG. 2 is a similar view to that of FIG. 1 showing the sleeve material stretched lengthwise and its resulting diametrical contraction.
FIG. 3 is a side elevation in section showing the sleeve material formed over a mandrel having the shape of the passageway desired.
FIG. 4 is a cross section on the line 4—4 of FIG. 3.
FIG. 5 is a fragmentary view showing an end of the sleeve of FIG. 3 crimped and tied shut against one end of the mandrel.
FIG. 6 is a similar view to FIG. 5 showing the sleeve on the mandrel and coated with adhesive or mold wash.
FIG. 7 is a side elevation in section of the finished core of the formed sleeve of FIG. 3 after trimming off the tied ends and melting out the mandrel, the so-obtained core or mold part being ready for assembly in a casting mold.
FIG. 8 is a fragmentary cross-sectional view of one end of the structure of FIG. 3 after removal of the mandrel and its replacement with a coated particulated filling material, e.g. shell molding sand which sets to a porous rigid heat friable structure on being cured.
FIG. 9 is a vertical cross section of a casting mold in which is assembled the core of FIG. 7.
FIG. 10 is a sectional elevation of a cylindrical mandrel covered with a sleeve and illustrates an initial stage of making a collapsible core in accordance with the invention for making a casting having passageways branching from and connected with a passageway.
FIG. 11 is a similar view to FIG. 10 showing the next stage in which the ends of the sleeve are tied and openings made in the sleeve for the addition of branches to the mandrel.

FIG. 12 is a similar view to FIG. 11 and illustrates the addition to the mandrel of two branches.

FIG. 13 is a similar view to FIG. 12 and illustrates the application of sleeves to the branches of the mandrel.

FIG. 14 is a similar view to FIG. 13 and illustrates the penultimate stage in the formation of the branched core on the branched mandrel.

FIG. 15 is a side elevational view, partly in section, illustrating the use of woven tape to form a sleeve around a mandrel.

In carrying out the invention, the sleeve material used may be, as indicated in FIG. 1, of cylindrical configuration with gas permeable wall 1 and adapted by and due to its manner of construction to be extensible and reducible in cross section when subjected to an elongating tension or pull as advantageously may be provided by braiding filamentary material or yarn into circularly hollow braided or woven tubular goods. The weave is more or less loose so that the sleeve is flexible and able to conform to the shape of the mandrel over which it is to be formed. The filaments, fibers or strands 2, of the sleeve are of ceramic material or silica, or metal such as woven stainless steel or copper, for example, capable of retaining adequate strength while subjected to the heat of the metal to be cast. For making light metal castings, such as those of magnesium, aluminum and alloys having one of these metals as a base, a generally suitable ceramic material for the sleeve is one of the common soda lime or borosilicate glasses in the form of fine fibers capable of being woven into tubular goods. The strands 2 of the fiber in the woven fabric generally present a herringbone pattern, as shown in FIGS. 1 and 2, for example, and when the so-woven fabric is stretched, as by an endwise pull, it lengthens and at the same time diametrically contracts, as indicated in the comparison of FIG. 2 with FIG. 1. The thickness of the wall 1 is not critical but may advantageously be from 0.003 to 0.04 inch thick. A generally suitable sleeve wall thickness is about 0.008 inch.

The sleeve is formed into shape by means of a fusible mandrel which has the shape desired for the passageway to be made in the casting and a cross section enough smaller so that when the sleeve is placed tightly over the mandrel the over-all cross section of the mandrel, sleeve, and coating to be applied later, will be substantially the cross section of the desired passageway in the casting to be made. One form of the mandrel 3, which is illustrated in FIG. 3, as an example, is made of a low melting point alloy. The following are examples of low melting point alloys, of which the mandrel may be made although others can be used.

| Alloy | Melting Point, °F. | Composition in Weight Percent | | | |
|---|---|---|---|---|---|
| | | Bi | Pb | Sn | Cd |
| A | 158 | 50 | 26.7 | 13.3 | 10 |
| B | 281 | 58 | 0 | 42 | 0 |
| C | 302 | 40 | 0 | 60 | 0 |

The mandrel is advantageously made somewhat longer than the course of the passageway desired. The extra length of the end portions is used to make the core correspondingly longer than the passageway. The length of end portions of the mandrel, e.g. 4 and 5, beyond the actual length desired for the passageway, e.g. the portion of the mandrel lying between the markings 6 and 7, respectively, may be from about 1 to 6 times the diametrical cross section of the mandrel. The extra length of the core beyond the markings is used for holding it in place in the casting mold as will be further explained later and is not critical.

For purposes of illustration rather than limitation the mandrel 3 shown in FIG. 1 is U-shaped but obviously may be given any desired form of substantially uniform cross section. The sleeve material of suitable length is slipped over the mandrel to form a snugly fitted cover 8 as shown. Sleeve material is chosen long enough to extend beyond the end portions of the mandrel, the amount of free sleeve material 9 and 10 beyond the ends of the mandrel being sufficient to permit crimping each open sleeve end together and tieing shut with a cord 11 as shown for one end in FIG. 5. This tieing of the sleeve ends keeps the sleeve from sliding off the mandrel and the sleeve material from becoming frayed.

Alternatively, as shown in FIG. 15, the sleeve may be a woven or fibrous tape 55 wound on a mandrel 57 with the exposed edge 59 of the tape slightly overlapping the adjacent edge 61 of the preceding spiral of tape.

After the sleeve material is in place on the mandrel an adhesive coating material is applied so as to cement the sleeve into a rigid structure and provide a smooth exterior surface. Various adhesives may be employed as for example an alcoholic solution of shellac which on air drying leaves a shellac film on the fibers of the sleeve rendering it rigid.

This type of coating or impregnate may be also achieved by impregnating the sleeve with an uncured resin which is subsequently cured. Typical of such resins are an unsaturated polyester or polyamide which may be cross-linked following impregnation by a monomeric material, containing at least two sites of ethylenic unsaturation, capable of cross-linking unsaturated polyesters. Typical of such monomeric materials are diallyl adipate, divinyl benzene, and triallyl cyanurate.

Representative of such polyesters and polyamides are those falling within the scope of the general formula:

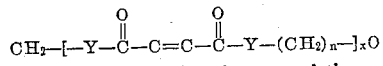

where Y is selected from the class consisting of nitrogen and oxygen; $n$ is a whole number of at least two; and $x$ is a whole number of from about 5 to about 20.

Unsaturated polyesters of this type may be cross linked by the catalyzed or uncatalyzed copolymerization with polyethylenically unsaturated monomers such as diallyl phthalate, diallyl adipate, divinyl benzene, and triallyl cyanurate.

Also finding utility as an impregnate are the liquid epoxy resins which may be cured to a rigid state by means of basic curing agents including the organic polyamines.

Of still further utility are the uncured or "A" stage resins of phenol and formaldehyde or the like. Other useful resins will be readily apparent to the skilled polymer chemist and judicious selection may be made of the impregnate without resort to undue experimentation. Some of these materials are liquids and impregnation may be made from this state. Other resins may be solid, in which event the resin must be dispersed in a medium suitable for impregnating. The dispersion may be a solution, colloidal suspension, emulsion, or a sol. This material may be applied by brushing, spraying, roller coating, dipping, or doctoring.

In one specific example of impregnate a polyester of ethylene glycol with maleic acid having the preponderant number of polymer chains containing from 5 to 20 recurring groups. A liquid comprising 70 percent by weight of said polyester and 30 percent by weight of diallyl phthalate with a small amount of benzoyl peroxide was applied to the woven material (the application may be made either before or after the woven material is placed over the mandrel). After the impregnated sleeve is over the mandrel in proper position, the assembly is heated at about 200 degrees F. for 1 to 5 minutes or until the resin mix has polymerized.

Another adhesive is made of polyvinyl chloride plastisol resin (.5–1 micron particles) along with dichlorostyrene and a mixture containing 50 percent divinyl benzene and 50 percent ethyl vinylbenzene. The adhesive comprises 50 percent by weight of polyvinyl chloride, 40 percent by weight of dichlorostyrene and 10 percent by weight of the above described mixture of divinyl benzene and ethyl vinyl benzene. At the time of use, benzoyl peroxide in amount equal to 1 percent of the weight of the other constituents is added. This adhesive polymerizes at 300 degrees F. in 3 to 5 minutes.

Whether the adhesive material used to make the sleeve a rigid structure is of natural or synthetic resinous nature, a refractory coating usually is applied because the sleeve must withstand the heat of casting metal against it. This is best accomplished by the application of a mold wash which sets on drying and baking. If desired, the application of the non-heat resistant adhesive, such as shellac or a synthetic resin, can be omitted and the mold wash applied directly to the sleeve of woven material while on the mandrel. A suitable coating can be built up on the sleeve by one or more applications of a mold wash preferably allowing each coating to dry, and therefore become somewhat hardened, after each application. A sufficient amount of coating material is applied to produce sufficient rigidity to enable the sleeve with its coating to be handled and used as a hollow core after the mandrel is removed. Coating thickness of 0.004 to 0.02 inch have been used satisfactorily in making cores ¼ inch in diameter and having a total length of about 12 inches. Suitable mold washes are those made of a slurry in water of finely comminuted bonding material such as a clay with which is mixed a refractory powder such as fine sand or other refractory oxide or silicate, e.g. zirconium silicate, bentonite is a suitable clay for a bonding material. These mold washes may be used on sleeves made of metallic fibers as well as sleeves made of ceramic fibers.

The application of the adhesive coating material or mold wash results in a uniform coating 12 on the sleeve covered mandrel as indicated in FIG. 6 which illustrates an end portion of the coated sleeve covered mandrel 3. Although as coated, the sleeve is substantially stiffened while on the mandrel, further stiffening occurs on heating the assembly as when melting out the mandrel. Preparatory to melting out the mandrel the ends, e.g. 14 (FIG. 6) projecting beyond the end, e.g. 15 of the mandrel, are trimmed off. The assembly of the mandrel and coated sleeve is then heated sufficiently to melt out the mandrel. While being so heated, the assembly is placed upon a suitable supporting surface and oriented so that as the alloy of the mandrel melts the molten alloy will run out of the coated sleeve. Baking of the coated sleeve is advantageously continued after melting out the mandrel, as at a temperature of up to 600° F. to harden the coating. The coated sleeve so-obtained is illustrated in FIG. 7 the interior 16 of which is hollow.

If desired, the hollow coated sleeve may be further stiffened by filling the interior with a free flowing particulate material, e.g. sand, the particles of which are coated with a suitable bonding material so that after the particulate material is in place, the particles may be caused to adhere to each other thereby forming a rigid but gas permeable filling strengthening the sleeve. The adhesive or bonding material to be used is one which will be destroyed by the heat of the casting operation to which the sleeve will be subjected. Suitable adhesives are those used, for example, in shell molding for coating the sand particles so used, such as certain of the phenolic resins and the like. One end of a filled coated sleeve similar to that of FIG. 7 is shown as an example in FIG. 8 with the particulate filling 17 in place. With the filling in place, the sleeve is then cured to set the binder or adhesive coating on the particulate material so that the particles will stick together. With shell molding sands conventionally in use for shell molding curing can be effected by heating the sleeve assembly for 30 minutes at 400° F.

The assembly of the sleeve with the particles of its particulate filling cemented together is stronger and may be handled without undue risk of breakage. It has the advantage of being heavier than an unfilled sleeve and does not tend as much to float in the molten metal during the casting operation in which it is to be used.

The mold part or core so made either with or without a filling is set in a mold, formed of conventional molding material, such as sand, in similar manner to a conventional core. This is shown for example in FIG. 9 in which the ends 18 and 19 of the coated core of FIG. 7 or filled core of FIG. 8 are inserted into the mold material of the drag 20 up to the markings 6 and 7, respectively, leaving the portion 21 between the ends exposed in the mold cavity 22.

The molten metal to be cast is poured into the mold cavity through the sprue 23 until the cavity 22, sprue 23, and riser 24 are filled with the metal to be cast. After the so-poured metal has hardened the casting so-obtained is removed from the mold and pounded to loosen the filling 17, if any, as well as the coating 12 which becomes friable from the heat of the casting operation. The sleeve 8 is then removed from the casting by pulling one end of the sleeve. The pulling causes the sleeve to stretch lengthwise and contract diametrically thereby shrinking away from the wall of the passageway formed in the casting by the core and slipping out of the casting leaving the desired passageway free of the core. In the event that remnants of the mold wash remain in the passageway after removing the sleeve, these may be removed by introducing into the passageway a 30 percent solution of hydrofluoric acid in the case of a magnesium or magnesium alloy casting. Ultrasonic cleaning methods also may be used with castings of all metals.

While the invention has been described more particularly in terms of a core producing a single continuous passageway in a casting, by modifications to be described, the method is applicable to the making of branched passageways. As an illustration of this modification reference is had to FIGS. 10 to 14, inclusive. In FIG. 10 is shown the main run of a mandrel 25 from which branches are to be formed so as to form a core having the exterior configuration desired for the interior of a ramified passageway of the casting. By main run is meant that portion of the mandrel which considered as a single piece is the longest of any of the portions of the required mandrel. In the main run 25, chosen for illustrative purposes, this is a straight cylindrical piece of substantially uniform cross section. It is obvious that this portion of the mandrel could have other shapes, as for example a shape like that of FIG. 3 and its cross section need not be substantially uniform in cross section from end to end.

Whatever the shape of the portion of the mandrel, without its branches, sleeve material, whether in the form of a hollow tube or as a strip as illustrated in FIG. 15, is applied over it to form a cover as in the case of an unbranched mandrel. Such a sleeve, covering mandrel portion 25 is shown in FIG. 10 and designed by numeral 26. It is made somewhat longer than the mandrel portion so that the ends 27 and 28 extend beyond the ends 29 and 30, respectively, of the mandrel portion shown. Ends 29 and 30 are then crimped together and tied as with cords 31 and 32, respectively, as shown in FIG. 11, thereby holding the sleeve in place and preventing the ends of the sleeve material from fraying. At the places along the mandrel portion 25 where there are to be branches, openings are made in the sleeve of a diameter corresponding to that of the branches. Two openings 33 and 34, respectively, are shown for example. Adjacent these openings, the required branched portions of the mandrel are added as by casting. This is accomplished by placing the assembly of FIG. 11 in a suitable mold or pattern and casting additional mandrel alloy therein against the openings 33 and 34 to form the branches as for example, those shown at 35 and 36, respectively, in FIG. 12.

On casting the metal of the branches against the mandrel portion 26, the branches 35 and 36 become welded to it at openings 33 and 34, respectively, forming an integral structure. Over each of these branches so-formed, sleeve material is applied to form the coverings 37 and 38, respectively, using somewhat longer pieces of sleeve than the lengths of the branches so that the outer ends 38 and 40 can be crimped together and tied with cord 41 and 42 as shown in FIG. 13. In applying the sleeve material to the branches, the inner ends 43 and 44, respectively, of the branch sleeves are brought up against the sleeve 26 as shown. With the mandrel thus fully covered with sleeve material, it is stiffened, as before, as by applying a mold wash and drying to harden it and cement together the fibers of the sleeve material as well as to provide a smooth coating over them as indicated by numeral 45 in FIG. 14. When the coating 45 is hardened so that the sleeves 26, 37 and 38 become rigid the sleeve ends 46, 47, 48 and 49 are trimmed off flush with the ends 50, 51, 52 and 53, respectively of the mandrel.

The assembly is then heated as before to melt out the mandrel and further stiffen or harden the coating 45. After melting out the mandrel, the resulting hollow rigid branched core or mold part is ready for use as a core in a conventional mold in similar manner to that described in connection with the unbranched core. After casting metal about a branched core, formed in accordance with the invention, the individual sleeve portions are readily removed from the casting by pulling on the ends of the sleeves.

While the invention has been heretofore described in connection with so called "sand" casting techniques, it is practicable to use the invention in making die castings. In such event sleeve impregnated or coated with a suitably chosen synthetic resinous adhesive of sufficiently high heat resistance may sometimes be used without a refractory mold wash being applied over the adhesive.

I claim:

1. The method of making a contractable core or mold part for insertion in a casting mold which comprises covering a readily fusible metallic mandrel with a sleeve of woven fibers, said sleeve diametrically contracting on being subjected to a lengthwise stretching, coating the sleeve with a refractory mold wash so as to cement together the fibers of the sleeve into a rigid structure, and meling out the mandrel prior to the insertion of said core in said casting mold.

2. The method of claim 1, wherein said woven fibers are ceramic.

3. The method of claim 2 in which the ceramic fibers are of a soda lime glass.

4. The method of claim 2 in which the ceramic fibers are of a borosilicate glass.

5. The method of claim 1 in which the refractory mold wash comprises a clay.

6. The method of claim 1 in which the mold wash comprises a clay and zirconium silicate.

7. The method of claim 1 in which the fusible mandrel has a melting point between 150° F. and 600° F.

8. The method of claim 1, in which the woven fibers are silica.

9. The method of claim 1, in which the woven fibers are metal fibers.

10. The method of claim 1, wherein the woven fibers are made of copper.

11. The method of claim 1, wherein the woven fibers are made of stainless steel.

12. The method of making contracting core for insertion in a casting mold for use in making a passageway in a casting which comprises forming a mandrel of a readily fusible alloy, said mandrel having a shape corresponding to that of the passageway, covering the mandrel with a sleeve of fibrous material, thereby making the sleeve conform to the external shape of the mandrel intermediate its ends, coating the sleeve in situ with a fluid ceramic material capable of being hardened on air drying, drying the so-coated sleeve so as to harden the coating, and heating the resulting assembly so as to melt out the mandrel prior to the insertion of said core in said casting mold.

13. The method according to claim 12 in which the fluid ceramic material comprises a clay and sand.

14. The method according to claim 12 in which the fluid ceramic material comprises a clay and zirconium silicate.

15. The method according to claim 12, wherein said fibrous material is ceramic.

16. The method according to claim 12, wherein said fibrous material is metallic.

17. The method according to claim 12, wherein said fibrous material is silica.

18. The method of claim 1, wherein the woven fibers are made of tinned copper.

19. The method of claim 1, wherein the sleeve of woven fibers comprises a tape wrapped around said mandrel.

20. The method of making a contractable core or mold part for insertion in a casting mold which comprises covering a readily fusible mandrel with a contractable sleeve of fibrous material, stiffening the sleeve into a rigid structure, and melting out the mandrel prior to inserting said part into a mold.

21. The method of claim 20, wherein said sleeve comprises a fibrous tape wrapped around said mandrel.

22. The method of claim 20, wherein in order to achieve stiffening thereof the sleeve is initially treated with a resin which is cured to a rigid state.

23. The method of claim 22, wherein said resin includes an unsaturated polyester which is cross linked by a monomeric material containing at least two sites of ethylenic unsaturation.

24. The method of making a contractable core or mold part for insertion in a casting mold which comprises covering a readily fusible mandrel with a contractable sleeve of fibrous material, stiffening said sleeve, coating the stiffened sleeve with a refractory mold wash, and melting out the mandrel prior to inserting said part in a casting mold.

References Cited in the file of this patent

UNITED STATES PATENTS

| | | |
|---|---|---|
| 2,614,058 | Francis | Oct. 14, 1952 |
| 2,724,216 | Cisne | Nov. 22, 1955 |
| 2,739,350 | Lampman | Mar. 27, 1956 |
| 2,812,562 | Dalton | Nov. 12, 1957 |
| 2,907,084 | Wood | Oct. 6, 1959 |